United States Patent [19]

Karnes, Jr. et al.

[11] Patent Number: 4,555,773
[45] Date of Patent: Nov. 26, 1985

[54] PRINTING WITH A DATA STREAM INCLUDING MERGED GRAPHIC AND ALPHANUMERIC DATA

[75] Inventors: Roy E. Karnes, Jr.; Rex A. McCaskill; Khoa D. Nguyen, all of Austin, Tex.

[73] Assignee: International Business Machines Corporation, Armonk, N.Y.

[21] Appl. No.: 493,402

[22] Filed: May 11, 1983

[51] Int. Cl.$^4$ .............................................. G06F 3/00
[52] U.S. Cl. .................................................... 364/900
[58] Field of Search ... 364/200 MS File, 900 MS File; 340/721, 722, 747, 750, 732, 736, 748

[56] References Cited

U.S. PATENT DOCUMENTS

| | | | |
|---|---|---|---|
| 3,594,759 | 7/1971 | Smura | 340/732 |
| 4,246,578 | 1/1981 | Kawasaki et al. | 340/750 |
| 4,272,767 | 6/1981 | Lacy | 340/722 |
| 4,283,723 | 8/1981 | Bickley et al. | 340/722 |
| 4,338,599 | 7/1982 | Leininger | 340/721 |

Primary Examiner—Raulfe B. Zache
Attorney, Agent, or Firm—J. B. Kraft

[57] ABSTRACT

A word processing system is provided with printing means for printing on a character by character basis a data stream including merged graphic and alphanumeric data. The word processing system is provided with an interactive display for displaying by character generation a data stream representative of alphanumeric characters to be printed together with means for printing the characters on a document on a character by character basis. Operator interactive apparatus is provided whereby the operator can form a graphics data stream which is displayable on said display by character generation. This graphics data stream may then be integrated into the existing alphanumeric data stream, and the data in this integrated data stream may then be applied to the printing means whereby the alphanumeric characters and the graphic characters represented by this data stream are printed character by character to provide a document having the integrated alphanumeric and graphic information.

13 Claims, 6 Drawing Figures

PRINTING WITH A DATA STREAM INCLUDING MERGED GRAPHIC AND ALPHANUMERIC DATA

DESCRIPTION

RELATED APPLICATIONS

This application is related to the following concurrently filed applications which are assigned to a common assignee and are incorporated herein by reference:

Application Ser. No. 493,403, filed May 11, 1983, by Johnny G. Barnes, James N. Chen and Gerald E. Hayes and entitled "A Word Processing System Based on a Data Stream Having Integrated Alphanumeric and Graphic Data".

Application Ser. No. 493,578 filed May 11, 1983, by Donald T. Crehan and Jerold D. Dwire and entitled "Display of Graphics Using a Non-All Points Addressable Display".

Application Ser. No. 493,677, filed May 11, 1983, by Danny B. Convis, Donald T. Crehan and Charles J. Lovell and entitled "Internal Image and Bit Array for Display and Printing of Graphics".

Application Ser. No. 493,572, filed May 11, 1983, by Donald T. Crehan and Charles J. Lovell and entitled "Display Menu/Chart Key".

TECHNICAL FIELD

The present invention relates to word processing systems having interactive display terminals, and more particularly to such systems with terminals having "character box" displays, i.e., displays which form the alphanumeric characters through the generation of such characters in "character boxes" on the display and printers which print on a character by character basis.

BACKGROUND OF THE INVENTION

Word or text processing systems having interactive display terminals permitting an operator to extensively edit and format alphanumeric data which is, in turn, printed out on an associated printer have been in ever increasing demand in the office products and systems field. Since a great many letters, articles to be published and books require some graphic material to be formatted into documents along with the alphanumeric text, there has been a need for improved editing capability with respect to graphics on word processor displays. There has also been a need to provide associated printing means which efficiently, inexpensively and rapidly print documents containing such integrated alphanumeric and graphics data.

Most conventional word processing systems with interactive display terminals generally operate the display terminal as a character generation or "character box" display. In such a display, an encoded representation of each of a font of characters is stored in a character generator memory, and as each character is to appear on the display during each display refresh cycle, the character generator memory is addressed and the coded representation of that particular character is taken from the memory and displayed in a particular and designated "character box" on the display. Similarly, most printers associated with existing word processing systems print their characters on a character by character basis. Such an association of a display terminal and printer is obviously a practical one since the data representation of a particular character in the display or editing level data stream may with minimum modification be utilized in the print level data stream to activate that particular character on the printer. Accordingly, in order to achieve desirable graphics capabilities in a word processing system, the graphics should be implementable in a character generation mode for display and for display purposes and be printable on a character by character basis on the printer.

The following prior art is representative of the handling of graphics on various displays.

U.S. Pat. No. 4,246,578, I. Kawasaki et al, Pattern Generation Display System, issued Jan. 20, 1981. This patent discloses a display on which both graphics and alphanumeric data may be shown. It does not use a character generator for the alphanumerics. Rather, all displayed material is generated through some sort of an All Points Addressable system.

U.S. Pat. No. 4,272,767, R. H. Lacy, Display System for Displaying Information in the Form of a Horizontally Oriented Curve on a Raster-Type CRT, issued June 9, 1981. In this display terminal for showing both alphanumeric and graphic material, the alphanumerics are generated through character generation but the graphics or curves appear to be generated by some other means involving vectors.

U.S. Pat. No. 4,338,599, S. Leininger, Apparatus for Alpha-Numeric/Graphic Display, issued July 6, 1982 covers a display for graphic and alphanumeric information. While the alphanumeric information appears to be displayed through some sort of character generation, the graphic data is displayed through a different scheme which does not appear to utilize character generation.

U.S. Pat. No. 4,283,723, R. H. Bickley et al, Apparatus and Method for Providing Digital and/or Bar Graph Displays of Measured Quantities, issued Aug. 11, 1981 appears to relate to a very specialized display forming both characters and simple bar graphs through a character generation method. However, the teaching is quite specialized and appears to be in no way suggestive of or related to the production of printed documents and particularly a word processing system controlling the printing of documents or the formation of graphics on such documents.

SUMMARY OF THE PRESENT INVENTION

The present invention provides a word processing system capable of editing and producing a document containing integrated graphics in alphanumeric information in a simple and efficient manner involving a single operation in the printing of the document. Interactive display terminal operates in the "character box" mode, i.e., the displayed alphanumeric material is formed by character generation. The word processing system further includes a printer for printing a document in a character by character mode. The present invention provides means for integrating into the alphanumeric data stream, data representative of graphics. This integrated graphics data has been converted into graphic characters so that the graphics may also be displayed on the display terminal through character generation. The system further includes means for applying the data in the data stream to printer means whereby the alphanumeric and the graphic characters represented by the data stream are printed character by character by the printer to provide a document having integrated alphanumeric and graphic information. Preferably the printer is a print wheel type of printer which has fonts including both graphic and alphanumeric characters. The printing is carried out in one operation with the characters either graphic or alphanumeric being printed in the sequence in which they are in the integrated data stream.

BRIEF DESCRIPTION OF THE DRAWINGS

Referring now to the drawings, wherein a preferred embodiment of the invention is illustrated, and wherein like reference numerals are used through out to designate like parts.

BEST MODE FOR CARRYING OUT THE INVENTION

Figure 1:
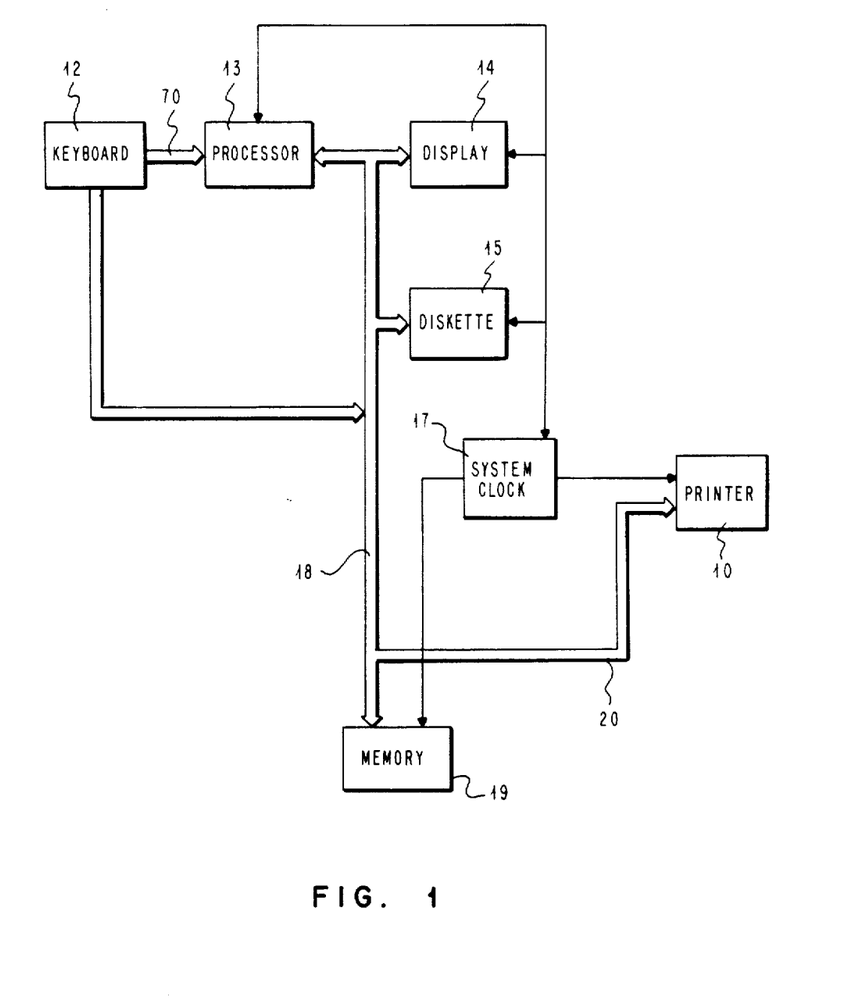
FIG. 1 is a logical block diagram showing the apparatus of the present invention in a generalized form.

With reference to FIG. 1, a generalized view of the apparatus which may be used to carry out the present invention is shown. The apparatus for carrying out this invention may be any conventional word or text processing system such as that described in co-pending application Ser. No. 274,050, filed June 16, 1981, D. G. Busch, "Data Communications System with Receiving Terminal for Varying the Portions of Received Data Being Displayed". In order to carry out the present invention, attached to the text processing system is a conventional printer 10 which may be any printer such as a daisy wheel printer which prints the alphanumeric text on the document to be produced character by character, i.e., in response to the coded representation of the next character to be printed in a particular data stream applied to the printer, a character is selected from the daisy wheel font. A typical print wheel or daisy wheel printer which may be used in accordance with the present invention is described in U.S. Pat. No. 4,189,246.

Figure 2:
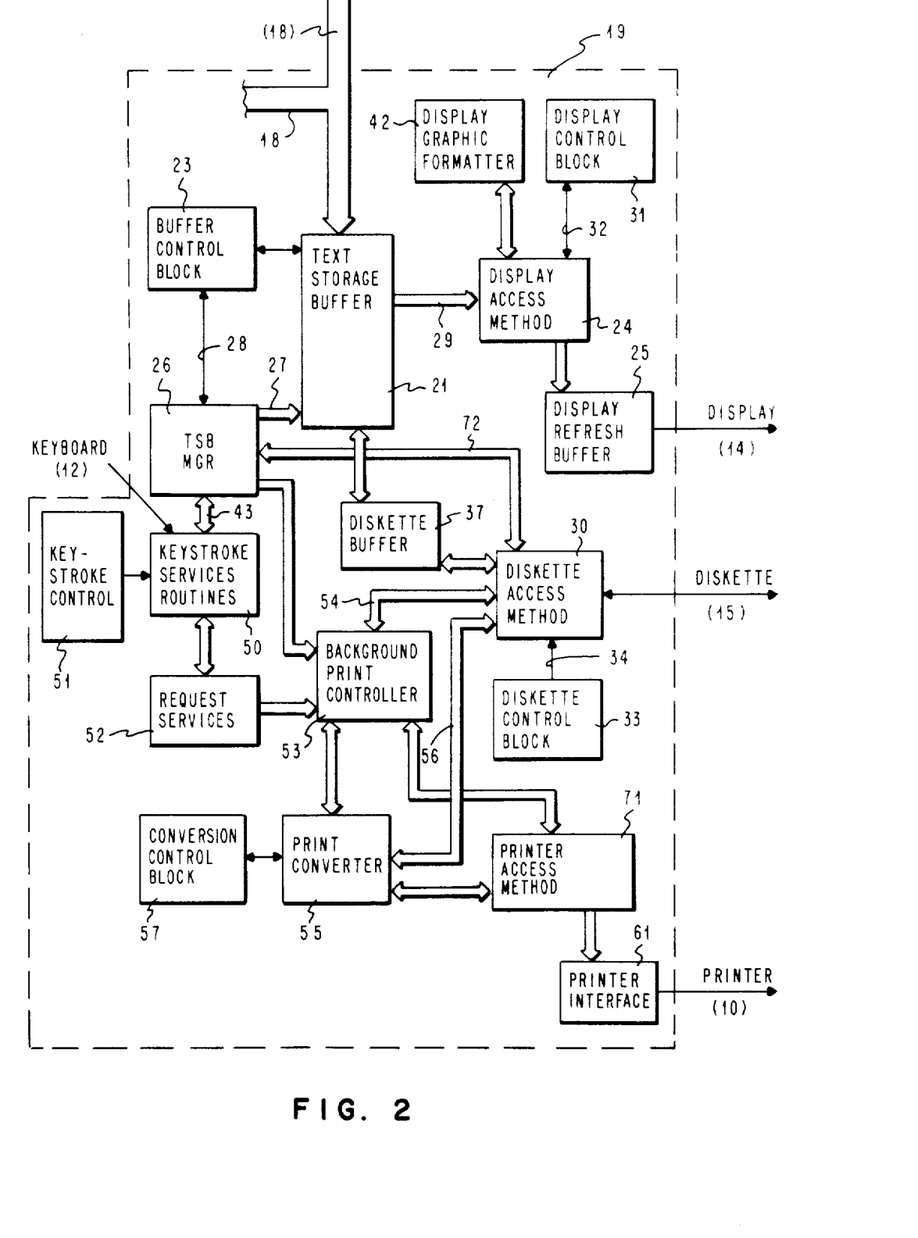
FIG. 2 is a logical block diagram showing the apparatus particularly in the memory portion of FIG. 1 in greater detail so that the steps involved in the present invention may be understood.

In performing the operations to be subsequently described, the operator accesses the word processor through a keyboard 12. The keyboard drives an internal microprocessor 13 which is operably connected to the display terminal 14 as well as to diskette storage means 15. The keyboard is further connected to random access memory 19 through memory buss 18. A system clock 17 is provided for timing functions within the word processing system. Printer 10 is communicated with over buss 20. The memory 19 provides means for storing data within the word processing system and also provides the programs for controlling display 14 to display data or control printer 10 to print data. FIG. 2 shows the elements of memory 19 pertinent to the present embodiment and particularly the functional programs which relate to the formatting of graphic data in the display, the integration of such graphic data with the alphanumeric data in the data stream supporting the display and the printing of the alphanumeric and graphic data. With respect to the general operation of the functional areas in memory 19 shown in FIG. 2, data input into memory is sent over buss 18 and stored in the text storage buffer 21 sequentially in the order in which it is received. The handling and updating of data stored in the text storage buffer 21 is controlled by routines stored within the text storage buffer manager (TSB) 26. Display access method program 24 controls the formatting of alphanumeric text representative of the data stored in the text storage buffer on visual display terminal 14 through display refresh buffer 25. It should be noted that the display refresh buffer 25 may operate in any conventional manner. However, in 20 the present example, a "BUILD" subroutine is used which is described in co-pending U.S. patent application Ser. No. 208,568, filed 11/20/80, W. C. Cason et al.

Text storage buffer (TSB) manager block 26 is connected to text storage buffer 21 by buss 27. The text storage buffer manager block 26 is further connected to buffer control block 23 through a channel 28. As previously indicated, the data representative of the alphanumeric text characters is input into buffer 21. The data representative of characters is stored sequentially in text storage buffer 21 in the order in which it is received. For convenience in description, this data will be referred to as text character data. In displaying the characters, text character data stored in buffer 21 is communicated to display access method 24 over channel 29. It should be noted that corresponding diskette access method block 30 is used instead of access method block 24 when communication between the text storage buffer 21 and the diskette 15 is desired.

A display control block 31 is connected through a channel 32 with display access method block 24. The corresponding diskette control block 33 communicates with diskette access method 30 over channel 34 when access to the diskette drive is required.

Considering now the access of the operator through the keyboard, this involves standard keyboard entry steps. As the operator enters each key stroke at the keyboard 12, a corresponding signal is transmitted through channel 42 to processor 13 which enters the key stroke command into the memory 19. In the memory, upon the receipt of a key stroke command, a key stroke routine is produced for key stroke service routine block 50 to handle the particular command received. This is carried out under the control of the key stroke control block 51. The key stroke command is then processed via channel 43 to the text buffer storage manager block 26 which has been programmed to control buffer control block 23 which carries out various processes with respect to the data stored in the text storage buffer 22.

Using the standard logic and programming described above with respect to FIGS. 1 and 2 as well as additional logic and programming functions to be hereinafter described, the operation of the present invention will now be described in the steps set forth in the flow chart of FIGS. 3–6. It should be noted that the logic and programming shown in FIGS. 1 and 2 relate to the word processing display unit of the type described in co-pending U.S. patent application Ser. No. 208,568 filed Nov. 20, 1980, W. C. Cason et al. Let us assume that we have a situation where an operator at the interactive display terminal of the word processing system is to commence to produce a document having both alphanumeric and graphic material in it. The operator first creates the alphanumeric portion of the document utilizing the steps involved in the flow chart of FIG. 3. The operator commences an alphanumeric edit and entry session, step 101, by depressing the appropriate key in keyboard 12, FIG. 1, which accesses key stroke service routine 50 in memory 19, FIG. 2, through processor 13 of FIG. 1. As a result, the appropriate key stroke service routine will be applied to text storage buffer manager 26 and consequently text storage buffer for the alphanumeric data entered through, step 102, keyboard 12, FIG. 1, proceeding through processor 13 and buss 18 to the text storage buffer 21 where the data is stored and available to display 14, FIG. 1, via display access method 24 and display refresh buffer 25, FIG. 2. Next, step 103, the alphanumeric data is edited utilizing the standard word processing editing capability of the particular word processor being used. For example, this editing is done on the above-mentioned word processor covered in patent application Ser. No. 208,568, W. C. Cason et al.

Figure 3:
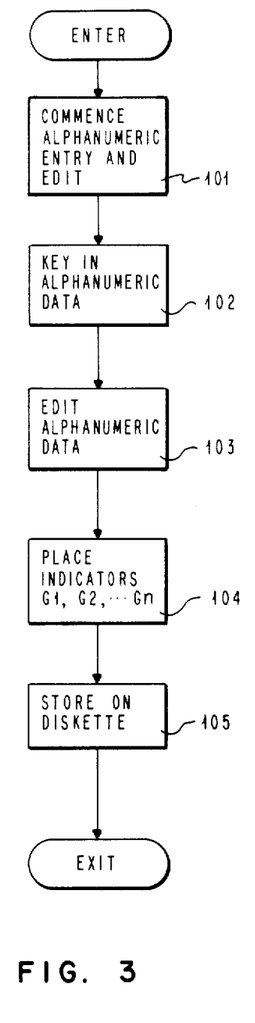
FIG. 3 is a flow chart of the operation involved in the formation of the basic alphanumeric data stream in accordance with the present invention

After the editing and formatting of the alphanumeric data has been completed, the operator enters at selected points in the document, step 104, indicators which indicate the position in the alphanumeric sequential data stream being created in text storage buffer 21 where graphics data is to be subsequently entered. These indicators are designated G1, G2 ... Gn. At this point, step 105, the alphanumeric data stream is stored on diskette 15, FIG. 1. This is brought about by a communication from the keyboard to key stroke service routine 50 through channel 43 to TSB MGR 26 to text storage buffer 21 which then proceeds through diskette buffer 37 and diskette access method 30 to put the data onto diskette 15. The alphanumeric entry and editing are now complete.

Figure 4:
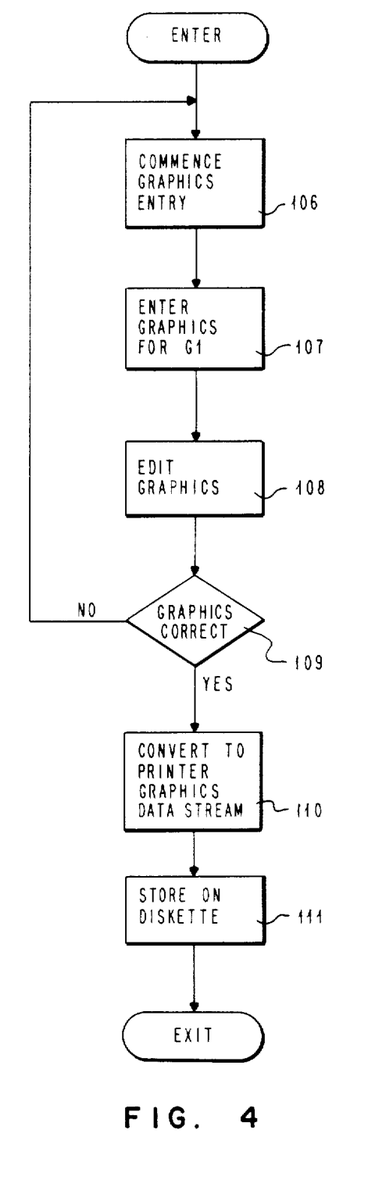
FIG. 4 is a flow chart of the operations involved in the present invention for forming the data stream representative of the graphics and for storing the graphic data on a diskette.

Now, with respect to FIG. 4, we will describe how the operator enters the appropriate graphic data in a separate operation. The graphics entry is commenced, step 106, again by the pressing of an appropriate key in keyboard 12 which accesses key stroke service routine 50 in memory 19 through processor 13 of FIG. 1. At this point, the operator again operating through keyboard 12 begins to enter data. The data entered through keyboard 12 of FIG. 1 will proceed through processor 13 and buss 18 to the text storage buffer 21 where the data is stored and available to display 14, FIG. 1, via display access method 24 and display refresh buffer 25 in FIG. 2. In step 107, the data is thus entered for graphics section G1 which represents the first graphics entry to be made in the document. In step 108, the entered graphics is edited.

It has been stated and described hereinabove that the alphanumeric data formed and edited on the word processor interactive display terminal of the present invention and currently being stored on diskette is character generation data. An encoded representation of each of a font of alphanumeric characters which is stored in the character generator memory of the word processor, and as each character is to appear on the display during a display refresh cycle, the character generator memory is addressed and the coded representation of that particular character is taken from the memory and displayed in a particular and designated "character box" on the display. In carrying out the present invention, the graphics being formed or edited on the display terminal is similarly represented by a plurality of graphic characters whereby the graphics appearing on the display is also represented by a sequence of coded representations of characters which are taken out of memory and displayed in a particular designated "character box" on the display during display refresh cycle. Details of such a character generation graphic display system which may be used in the practice of the present invention are set forth in the above referenced related application by Donald T. Crehan and Jerold D. Dwire entitled "Display of Graphics Using a Non-All Points Addressable Display" filed concurrently with the present invention. This referenced graphics display system is designed to operate on the same word processing display terminal used in the practice of the present invention. This co-pending application provides for a font of characters which may be used on the display to produce rectilinear and curvilinear graphics.

It should be also noted that the construction of the graphics by the operator on the operator interactive word processing terminal described above may be carried out using the techniques described in another above referenced co-pending application by Donald T. Crehan and Charles J. Lovell entitled "Display Menu/Chart Key" also filed concurrently with the present application. The graphic formatting operation described in that application involves graphic formatting through a series of menus giving the operator a choice of graphic structural elements which may be incorporated to form the graphic image and which menus the operator may alternate with the actual display of the graphics under construction as created by the menus through the expedient of a simple switch button on the keyboard. The operator may thus continue switching back and forth between the menus and the graphics under construction until the graphics have been completed to his satisfaction. This decision is indicated by decision step 109 in FIG. 4 in which the operator determines whether or not the graphics he has created are correct. If still not correct or satisfactory, the process provides for a loop back to step 106 for further entry and editing of the graphics. On the other hand if the graphics are satisfactory, the process will now proceed to convert the display level graphics data stream which has just been created and stored in text storage buffer 21 to a print level data stream. The desirability of such conversion may be better understood if reference is made to another of the above referenced co-pending applications, entitled "Internal Image and Bit Array for Display and Printing of Graphics", D. B. Convis, D. T. Crehan and C. J. Lovell. In accordance with the system of such co-pending application, it was determined that the data stream required to support a printer, i.e., a print wheel printer which produces graphics character by character must be more elaborate than the data stream required to support equivalent graphic characters on a display produced by character generation. In other words, graphics to be produced on the printer are of a much higher resolution than the equivalent images on the display and consequently require a modified or converted printer level data stream. Consequently, in the present embodiment, utilizing the system of said co-pending Convis et al application, the graphics data stream is converted into a data stream representative of graphic characters to be produced on the character by character printer. In this conversion, first, step 110, FIG. 4, the print conversion is carried out by print controller 53, FIG. 2, invoking the printer converter 55, and the data stream representative of graphics which has been stored in a text storage buffer is applied via the background print controller to the print converter 55. The print converter then proceeds to convert the data stream representative of graphics into the print level data stream by applying predetermined values stored in tables in conversion control block 57. This conversion may be carried out by applying the principles set forth in said co-pending Convis et al patent application. The resulting sequential print level data stream representative of the graphic characters to be printed by printer 10 is then, step 111, also stored in an appropriate and designated diskette storage means 15. This is brought about by a communication from keyboard to key stroke service routine 50 through channel 43 to TSB MGR 26 to text storage buffer 21 which then proceeds through diskette buffer 47 and diskette access method 30 to put data representative of the print level graphics data stream onto diskette 15. It should be noted that this procedure is repeated for each of the indicated graphic entries, G2 ... Gn. At this point both the alphanumeric entry and editing as well as the graphics entry and editing is now completed.

Now with respect to FIG. 5, there will be described a process wherein the graphic and alphanumeric data are integrated into a single data stream. First, step 112, the alphanumeric portion of the document which has been previously stored on diskette is accessed from diskette 15 through diskette access method 30. This is brought about by a communication from key stroke service routine 50 through channel 43 to TSB MGR 26 and text storage buffer 21 proceeding through diskette buffer 37 via diskette access method 30. The resulting accessed alphanumeric data stream is stored in text storage buffer 21. Next, the alphanumeric data stream thus obtained from diskette is prescanned in order to process this display level data stream into one which will operate a printer. During such data stream preparation, pagination with attendant justification is usually carried out, and it is at this point that the data representative of graphics which is also stored on diskettes will be merged into the data stream. In any event, the initial preparation and processing of this data stream at this point may be carried out using the procedures described in co-pending application Ser. No. 440,235, filed Nov. 9, 1982, J. L. Gaudet et al, entitled "Justifying with Printer Level Data Stream Which Accomodates Footers and Headers". This will achieve the requisite justification and pagination. During this initial scanning of the alphanumeric data stream, a determination is made, decision step 14, FIG. 5 as to whether a graphic indicator previously described with respect to FIG. 3, i.e., G1,G2 ... Gn is present. If such an indicator is found, then step 115, the graphic data stream currently stored on diskette 15 indicated Gx is accessed. Here again through text storage buffer manager 26 and text storage buffer 21, the appropriate portion of the data stream representative of graphics is inserted sequentially from indicator Gx in the text storage buffer 21, step 116, FIG. 5. Next, or in the case where there is no graphic data indicator (step 114), the merged graphic and alphanumeric data stream is stored on a diskette, step 117 where the merged data stream is ready to be printed.

Figure 6:
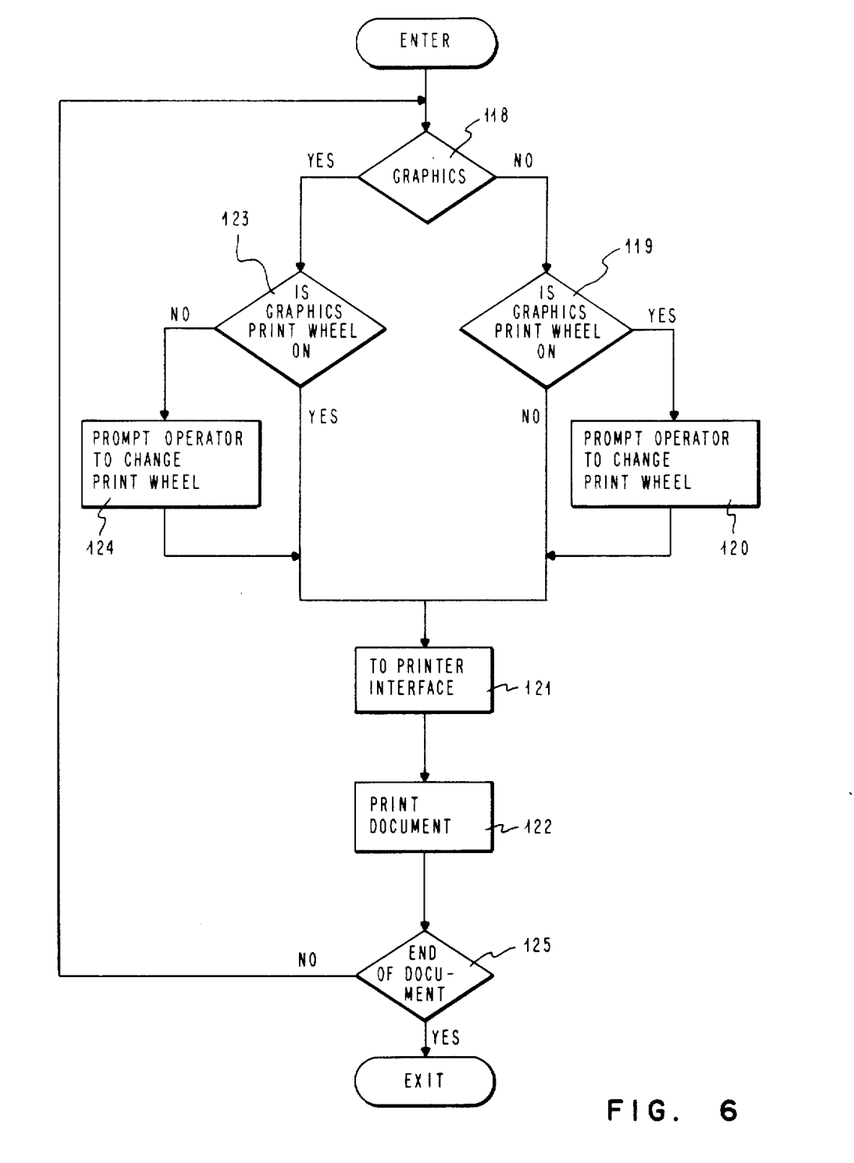
FIG. 6 is a flow chart of the operations involved in the present invention in applying the data representative of the alphanumeric characters and the graphics to the printing means for producing the final document.

Now, with reference to FIG. 6, we will describe the process involved in the printing of the document from the merged data stream which is stored on the diskette storage 15. When the operator is ready to print the document and depresses the appropriate key in the keyboard 12, key stroke services routine 50 is contacted and proceeds through request services 52 to background print controller 53 which activates printer access method to begin the printing operation. The data stream which has been stored on diskette is again accessed through the above described diskette access method and applied to the printer access method 58 through the background print controller 53, FIG. 2.

Figure 5:
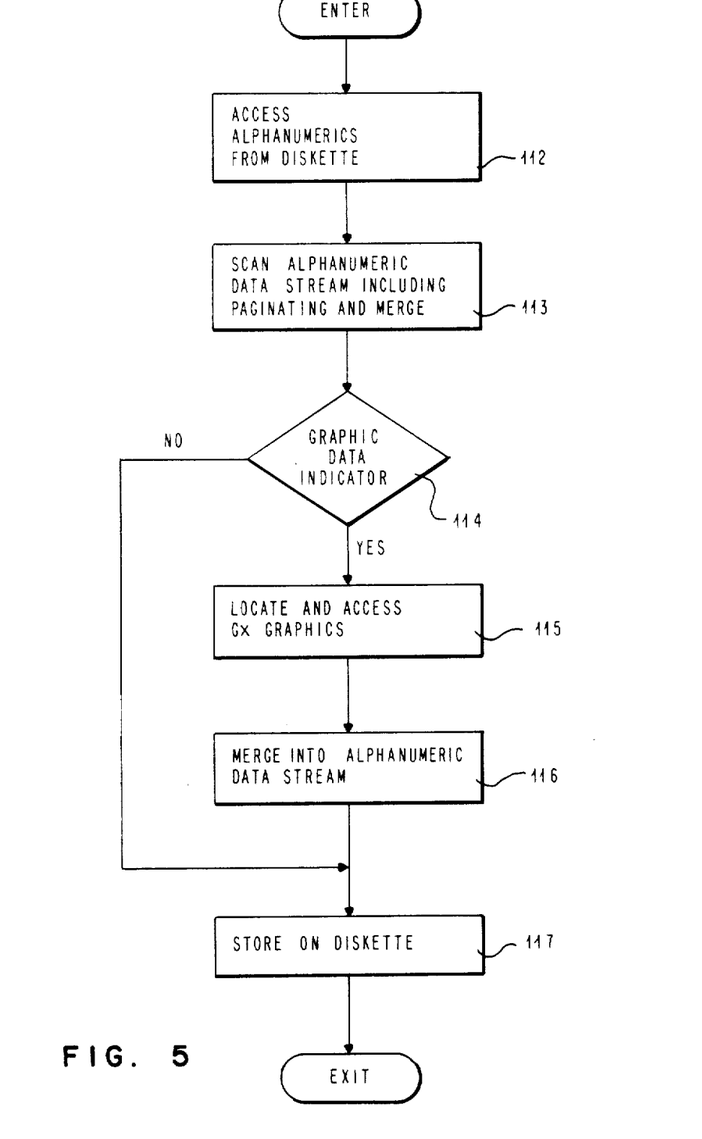
FIG. 5 is a flow chart of the operations involved in the present invention in the integration of the graphic data into a data stream representative of both graphic and alphanumeric data.

It should be noted that in the process described with respect to FIG. 5, it is not necessary to store the merged graphic and alphanumeric data stream on a diskette (step 17). This step may be eliminated by setting up the control process whereby upon the completion of step 116 in FIG. 5 the process proceeds to step 118 in FIG. 6, and the merged data stream is printed directly without the intermediate storage step.

Again, with reference to FIG. 6, at this point, step 118, a determination is made as to whether the next session of data in the data stream is representative of graphics or alphanumeric data. The data stream contains a series of prefixes, i.e., corresponding to Gx which are used to identify the graphic and alphanumeric data and to distinguish such portions of data stream from each other. If the data is not graphic in nature, then, step 119 is carried out, to determine if there is a graphics print wheel on the printer 110. If the graphics print wheel is on the printer, the display will prompt the operator to change the print wheel to an alphanumeric print wheel. At this point we are ready to print the alphanumeric data stream and, step 121, the printer access method applies the data stream to the printer interface and the document is printed upon with the corresponding alphanumeric data on printer 10, step 122. Similarly, if in decision step 118, a determination is made that the next portion of the data stream is graphics in nature, then, a determination is then made at decision step 123 as to whether the graphics print wheel is on the printer 10. If the graphics print wheel is not on the printer, then, step 124, the operator is again prompted to change the print wheel. At this point, we are ready to print the graphics portion of the data stream and process proceeds through steps 121 and 122 to now print graphics on the document in printer 10. This procedure is repeated until a determination is made in decision block 125 that the end of the document is reached and the printing process is now completed.

While the invention has been particularly shown and described with reference to a preferred embodiment it will be understood by those skilled in the art that various other changes in form and detail may be made without departing from the spirit and scope of the invention.

We claim:

1. In a word processing system having an interactive display terminal for displaying by character generation a data stream representative of alphanumeric characters to be printed on a document and means for printing character by character on said document, the improvement comprising
    means for integrating into said data stream, data representative of graphics,
    means for converting said integrated graphics data into graphic characters whereby said graphics are also displayed through character generation, and
    means for applying the data in said data stream to said printing means whereby said alphanumeric and graphic characters represented by said data stream are printed character by character to provide a document having integrated alphanumeric and graphic information.

2. The word processing system of claim 1 wherein said printing means is a print wheel printer having fonts including graphic and alphanumeric characters.

3. The word processing system of claim 2 wherein said printing means includes means for printing said alphanumeric and graphic characters in one printing operation in the sequence of said characters in said data stream.

4. In a word processing system having an interactive display terminal for displaying by character generation a data stream representative of alphanumeric characters to be printed on a document and means for printing character by character on said document, the improvement comprising
 operator interactive means for forming a graphics data stream displayable by character generation
 means for integrating said graphics data stream into said alphanumeric data stream, and
 means for applying the data in said integrated data stream to said printing means whereby said alphanumeric and graphic characters represented by said data stream are printed character by character to provide a document having integrated alphanumeric and graphic information.

5. The word processing system of claim 4 further including means for inserting into said alphanumeric data stream indicators marking wherein said alphanumeric stream, said graphic data stream is to be subsequently integrated.

6. The word processing system of claim 5 further including means for inserting into said alphanumeric stream in association with said indicators data indicating the extent of said graphic data stream.

7. The word processing system of claim 6 wherein said inserted indicators and data predetermine the position and amount of space which the graphics represented by the graphics data stream will occupy on the document.

8. In a word processing method including the steps of displaying by character generation on an interactive display terminal a data stream representative of alphanumeric characters to be printed, editing said displayed data and printing said alphanumeric characters on a document character by character, the steps comprising
 integrating into said data stream data representative of graphics
 converting said integrated graphics data into graphic display characters whereby said graphics are also displayed through character generation, and
 printing the graphic and alphanumeric characters represented in said data stream character by character to provide a document having integrated graphic and alphanumeric information.

9. The word processing method of claim 8 wherein said characters are printed on a print wheel printer having fonts including graphic and alphanumeric characters.

10. The word processing method of claim 9 wherein said graphic and alphanumeric characters are printed in one printing operation in the sequence of said characters in said data stream.

11. In a word processing method including the steps of displaying by character generation on an interactive display terminal a data stream representative of alphanumeric characters to be printed, editing said displayed data and printing said alphanumeric characters on a document character by character, the steps comprising
 forming a graphics data stream displayable on said terminal by character generation,
 integrating said graphics data stream into said alphanumeric data stream data, and
 applying the data in said integrated data stream to said printing means whereby said alphanumeric and graphic characters represented by said data stream are printed character by character to provide a document having integrated alphanumeric and graphic information.

12. The word processing method of claim 11 further including the step of inserting into said alphanumeric data stream indicators marking where in said alphanumeric stream, said graphic data stream is to be subsequently integrated.

13. The word processing method of claim 12 further including the step of inserting into said alphanumeric stream in association with said indicators data indicating the extent of said graphic data stream.

* * * * *

UNITED STATES PATENT AND TRADEMARK OFFICE
CERTIFICATE OF CORRECTION

PATENT NO. : 4,555,773

DATED : Nov. 26, 1985

INVENTOR(S) : R. E. Karnes, Jr. et al

It is certified that error appears in the above—identified patent and that said Letters Patent is hereby corrected as shown below:

Column 4, line 17, delete "20".

Signed and Sealed this

Tenth Day of February, 1987

Attest:

DONALD J. QUIGG.

Attesting Officer

Commissioner of Patents and Trademarks